United States Patent
Molinier (10) Patent No.: US 10,660,012 B2
(45) Date of Patent: May 19, 2020

(54) METHOD FOR ASSIGNING A TERMINAL TO AN ACCESS NETWORK OF A WIRELESS COMMUNICATION SYSTEM

(71) Applicant: SIGFOX, Labege (FR)

(72) Inventor: Lionel Molinier, Toulouse (FR)

(73) Assignee: SIGFOX, Labege (FR)

( * ) Notice: Subject to any disclaimer, the term of this patent is extended or adjusted under 35 U.S.C. 154(b) by 26 days.

(21) Appl. No.: 16/315,650

(22) PCT Filed: Jul. 11, 2017

(86) PCT No.: PCT/FR2017/051900
§ 371 (c)(1),
(2) Date: Jan. 6, 2019

(87) PCT Pub. No.: WO2018/011517
PCT Pub. Date: Jan. 18, 2018

(65) Prior Publication Data
US 2019/0182745 A1   Jun. 13, 2019

(30) Foreign Application Priority Data
Jul. 11, 2016 (FR) .................................. 16 56628

(51) Int. Cl.
| H04W 40/24 | (2009.01) |
| H04W 8/08 | (2009.01) |
| H04W 48/16 | (2009.01) |
| H04W 48/20 | (2009.01) |
| H04W 84/18 | (2009.01) |

(52) U.S. Cl.
CPC ............. *H04W 40/24* (2013.01); *H04W 8/08* (2013.01); *H04W 48/16* (2013.01); *H04W 48/20* (2013.01); *H04W 84/18* (2013.01)

(58) Field of Classification Search
CPC ..... H04W 48/16; H04W 40/24; H04W 48/20; H04W 84/18; H04W 8/08
USPC .......................................................... 370/328
See application file for complete search history.

(56) References Cited

U.S. PATENT DOCUMENTS

| 2006/0189308 A1* | 8/2006 | Kurata | H04W 36/06 455/422.1 |
| 2008/0107076 A1 | 5/2008 | Ramachandran et al. | |
| 2008/0192677 A1 | 8/2008 | Abusch-Magder et al. | |
| 2009/0122769 A1* | 5/2009 | Hirano | H04W 64/00 370/338 |
| 2011/0294527 A1* | 12/2011 | Brueck | H04W 36/0061 455/466 |
| 2015/0148042 A1* | 5/2015 | Hansson | H04W 36/0088 455/436 |

(Continued)

*Primary Examiner* — Robert J Lopata
(74) *Attorney, Agent, or Firm* — Im IP Law; Chai Im; C. Andrew Im (57) ABSTRACT

A method for associating a terminal to a base station of an access network. When a base station receives a message from the terminal, the base station updates a local association table by storing an identifier of the terminal in the local association table. A predetermined mobility criterion of the terminal is evaluated by the access network. When the mobility criterion is verified, a neighbouring base station that has not received the message from the terminal updates the local association table of the neighbouring base station by storing the identifier of the terminal in the local association table of the neighbouring base station.

19 Claims, 3 Drawing Sheets

(56) References Cited

U.S. PATENT DOCUMENTS

| | | | |
|---|---|---|---|
| 2015/0189565 A1* | 7/2015 | Sung | H04W 48/16 |
| | | | 370/332 |
| 2016/0295448 A1* | 10/2016 | Cai | H04W 72/12 |
| 2017/0070904 A1* | 3/2017 | Mali | H04W 72/042 |
| 2017/0078895 A1* | 3/2017 | Sriram | H04W 24/10 |
| 2017/0188276 A1* | 6/2017 | Melin | H04W 36/0083 |
| 2018/0249361 A1* | 8/2018 | Otsuki | H04W 16/18 |

* cited by examiner

METHOD FOR ASSIGNING A TERMINAL TO AN ACCESS NETWORK OF A WIRELESS COMMUNICATION SYSTEM

RELATED APPLICATIONS

This application is a § 371 application of PCT/FR2017/051900 filed Jul. 11, 2017, which claims priority from French Patent Application No. 16 56628 filed Jul. 11, 2016, each of which is incorporated herein by reference in its entirety.

TECHNICAL FIELD

The present invention relates to the field of digital telecommunications, and relates more specifically to a method for associating a terminal and a base station of an access network of a wireless communication system.

BACKGROUND OF THE INVENTION

The present invention has a particularly advantageous application, although not at all limiting, in ultra-narrow band wireless communication systems. "Ultra-narrow band" (or UNB) means that the instantaneous frequency spectrum of radioelectric signals transmitted by terminals, towards an access network, is of frequency width less than two kilohertz, even less than one kilohertz.

Such UNB wireless communication systems are particularly suitable for M2M type applications ("Machine-to-Machine") or "Internet of Things" ("IoT") type.

In such a UNB wireless communication system, the data exchanges are mainly made over an uplink from terminals towards an access network of said system.

The terminals transmit messages which are collected by base stations of the access network, without having to be associated beforehand to one or more base stations of the access network. In other words, the messages transmitted by a terminal are not sent to a specific base station of the access network, and the terminal transmits its messages on its own initiative by assuming that they can be received by at least one base station.

Such arrangements are advantageous in that the terminal does not need to take regular, intensive measurements, in particular from an electrical consumption viewpoint, to determine the most suitable base station for receiving its messages, and does not need to implement an association procedure with this base station before transmitting towards this base station the messages comprising data.

The complexity lies mainly on the access network, of which each base station must be capable of receiving messages which can be transmitted:
at arbitrary times,
over arbitrary frequencies,
by an arbitrary number of terminals being located in a coverage zone of said base station.

Thus, each base station receives the messages from all the terminals which are located in its coverage zone and, for example, retransmits wholly or partially data included in each message received towards one or more data servers of the access network.

Such as indicated before, such a UNB wireless communication system does not require, for the terminals, to implement an association procedure with a base station of the access network, and the base stations must cope with it.

However, the retransmission of data included in the messages towards a data server can implement a communication protocol requiring that communication resources are reserved before any data exchange. Given that the base stations of the access network do not know, a priori, when they will receive messages from terminals, and do not know from how many terminals they will receive messages, it is not currently possible to ensure that there will always be enough available communication resources to retransmit the data included in all the messages received.

This results in the data of certain messages needing to be temporarily stored by the base station, until they can be retransmitted to the data server, which leads to a delay in the retransmission which can be critical for certain applications. Data from certain messages can furthermore be lost if the quantity of data to be stored by the base station is greater than the storage capacity of said base station.

OBJECT AND SUMMARY OF THE INVENTION

The present invention aims at overcoming, wholly or partially, the limitations of the solutions of the prior art, in particular those described above, by proposing a solution which makes it possible to establish, at a base station, an at least partial knowledge of the terminals from which it is likely to receive messages, without said terminals having to implement an association procedure with said base station.

Furthermore, the present invention also aims at proposing a solution which makes it possible, in certain cases, to establish, at a base station, the knowledge of a terminal, before said base station had received a message transmitted by this terminal.

To this end, and according to a first aspect, the invention relates to a method for associating a terminal with a base station of an access network of a wireless communication system, said access network comprising a plurality of base stations. Said method comprises, when a base station, termed "service base station", receives a message from said terminal:

an updating, by the service base station, of a local association table of said service base station by storing, in said local association table of said service base station, an identifier of said terminal as a terminal associated with said service base station, an evaluation, by the access network, of a predetermined mobility criterion of said terminal, when said mobility criterion is verified: an updating, by a base station neighbouring the service base station and not having received the message from said terminal, of a local association table of said neighbouring base station by storing the identifier of said terminal in said local association table of the neighbouring base station as a terminal associated with said neighbouring base station.

Thus, each base station of the access network keeps updated a local association table which comprises a list of identifiers of the terminals which are associated with it, i.e. from which said base station is likely to receive messages. "Local" means at the base station in question. Indeed, the local association table is not, by nature, the same for all the base stations of the access network, since the local association table of a given base station comprises the lists of identifiers of the terminals which are associated with it. Therefore, it is understood in particular that the local association tables of remote base stations will be different, since the respective lists of identifiers of terminals associated with each of these remote base stations will be different.

A base station in the coverage zone of which is located a terminal is referred to by "service base station" for this terminal. At a given moment, a terminal is located in the coverage zone of one or more service base stations, and each service base station which receives a message transmitted by this terminal updates its local association table to add to it the identifier of said terminal. If the local association table already comprises the identifier of said terminal, the updating consists in confirming that the identifier must be conserved in the local association table. By this updating, a service base station therefore knows that other messages are likely to be received, later, from the same terminal.

Furthermore, the access network evaluates, using messages received from said terminal, a mobility criterion of said terminal. In other words, the access network determines if the terminal is likely to move to the coverage zone of another base station of the access network.

If the mobility criterion is verified for said terminal, i.e. if said terminal is likely to move to the coverage zone of another base station of the access network, then the local association table of one (or more) base station(s) neighbouring the service base station, which has/have not received the message from said terminal, is also updated to add to it the identifier of said terminal. Thus, such a neighbouring base station is informed that it is likely to receive in the near future messages from this terminal, and in certain cases, even before said neighbouring base station had received a message transmitted by this terminal.

By keeping its local association table updated, a base station knows at least one part of the terminals from which it is likely to receive messages. Such a knowledge can be implemented, for example, to allocate communication resources between the base station and a data server to which said base station must retransmit data included in the messages received. Thus, said base station can reserve communication resources for messages likely to be received later, and this in a quantity suitable for limiting the delay in the retransmission and/or the loss of data.

In specific embodiments, the association method can further comprise one or more of the following characteristics, taken individually or according to any technically possible combinations.

In specific embodiments, the identifier of a terminal is removed from the local association table of a base station of the access network when a predetermined removal criterion is verified.

In specific embodiments, the method comprises, for each message received from said terminal by the service base station, a measurement of a physical characteristic of said message and/or an extraction of an item of information included in said message, and the mobility criterion is evaluated using at least one physical characteristic measurement and/or using at least one item of information extracted. For example, it is possible to measure one or more of the following physical characteristics of the message received from said terminal: reception power of the message, reception frequency of the message, reception date of the message, etc.

In specific embodiments, the association method comprises, for each message received from said terminal, by the service base station, an estimation of the quality of a channel between said terminal and said service base station, and the mobility criterion is evaluated using at least one value of the quality of the channel.

In specific embodiments, the estimation of the quality of the channel for a message comprises a measurement of the reception power of said message by the service base station.

In specific embodiments, the evaluation of the mobility criterion comprises a calculation of a magnitude represen- tative of the variation of the value of the quality of the channel for a plurality of messages, the mobility criterion being verified when the magnitude calculated verifies a predetermined criterion of variation of the quality of the channel. For example, the criterion of variation of the quality of the channel is verified when the magnitude calculated is representative of a variation greater than a predetermined threshold value.

In specific embodiments, the mobility criterion is verified when the value of the quality of the channel for the last message received is less than a predetermined threshold value.

In specific embodiments, the method comprises, for a message received from said terminal by at least two service base stations, a measurement of a reception frequency and/or a reception date of said message by said at least two service base stations, and the evaluation of the mobility criterion comprises a comparison of the reception frequencies measured, and/or reception dates measured by said at least two service base stations.

In specific embodiments, the association method comprises a determination of a service class associated with said terminal, and the updating of the local association table comprises the storage of the service class associated with said terminal in said local association table of the service base station.

In specific embodiments, the determination of the service class of said terminal comprises:
  a transmission, by the service base station, of a notification towards an association server,
  a determination, by the association server, of the service class associated with said terminal,
  a transmission, by the association server, of the service class associated with said terminal towards the service base station.

According to a second aspect, the present invention relates to an access network of a wireless communication system, said access network comprising a plurality of base stations of which at least one base station suitable for receiving a message from a terminal, termed "service base station". Said access network comprises means configured to, when the service base station, receives a message from said terminal:
  updating a local association table of the service base station by storing an identifier of said terminal in the local association table of the service base station as a terminal associated with said service base station,
  evaluating a mobility criterion of said terminal,
  when said mobility criterion is verified: updating a local association table of a base station neighbouring the service base station and not having received the message from said terminal by storing the identifier of said terminal in said local association table of the neighbouring base station, as a terminal associated with said neighbouring base station.

In specific embodiments, the access network can further comprise one or more of the following characteristics, taken individually or according to any technically possible combinations.

In specific embodiments, each base station comprises means configured to remove the identifier of a terminal from the local association table when a predetermined removal criterion is verified.

In specific embodiments, the access network comprises means configured to measure a physical characteristic of each message received from said terminal and/or to extract an item of information included in each message received from said terminal, and means configured to evaluate the mobility criterion using at least one physical characteristic measurement and/or using at least one item of information extracted.

In specific embodiments, the access network comprises means configured to estimate the quality of a channel between the terminal and the service base station, and means configured to evaluate the mobility criterion using the values of the quality of the channel estimated for a plurality of messages received from said terminal.

In specific embodiments, the access network comprises means configured to measure a reception frequency and/or a reception date of each message received from said terminal, and means configured to evaluate the mobility criterion by comparing measured reception frequencies and/or measured reception dates for one same message received by at least two service base stations.

In specific embodiments, each base station being suitable for retransmitting data included in each message received towards a data server of the access network, said access network comprises means configured to allocate, to each base station, communication resources between the base station and the data server using the local association table of the base station.

In specific embodiments:
the service base station comprises means configured to transmit a notification towards an association server of said access network,
the association server comprises means configured to determine a service class associated with said terminal,
the association server comprises means configured to transmit the service class associated with said terminal towards the service base station,
the service base station comprises means configured to update the local association table by storing the service class associated with said terminal.

In specific embodiments, the association server comprises a global association table storing a list of identifiers of terminals of the wireless communication system and, for each terminal identifier, an associated service class.

In specific embodiments, several communication protocols are used in the access network to exchange data between a base station and a data server, and each base station is suitable for exchanging data with said data server by using at least one of the communication protocols of the access network.

PRESENTATION OF THE FIGURES

The invention will be better understood upon reading the following description, given as a not-at-all limiting example, and made by referring to the figures which represent.

In these figures, identical references from one figure to another designate identical or similar elements. For reasons of clarity, the elements represented are not to scale, except for any indication to the contrary.

DETAILED DESCRIPTION OF EMBODIMENTS

Figure 1:
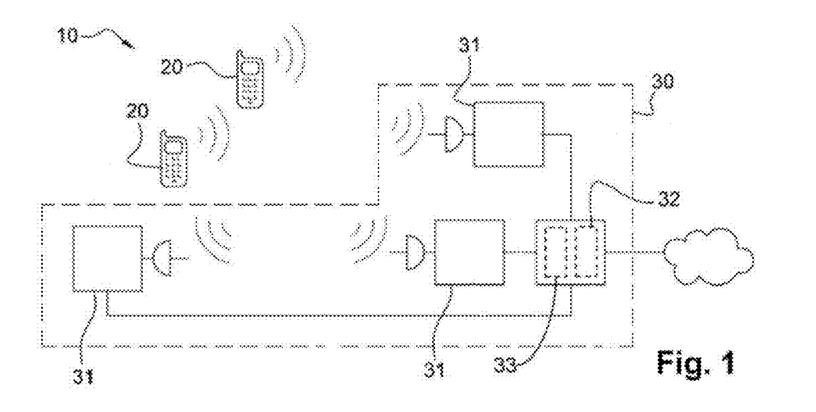
FIG. 1: a schematic representation of a wireless communication system.

FIG. 1 schematically represents a wireless communication system 10, for example of UNB type, comprising several terminals 20 and an access network 30. Such as illustrated in FIG. 1, the access network 30 comprises several base stations 31.

The terminals 20 and the base stations 31 of the access network 30 exchange data in the form of radioelectric signals. "Radioelectric signal" means an electromagnetic wave propagating via wireless means, the frequencies of which are comprised in the traditional spectrum of radioelectric waves (a few hertz to several hundred gigahertz).

In particular, the terminals 20 are suitable for transmitting messages on an uplink towards the access network 30.

The messages are preferably transmitted in a non-coordinated manner. "Non-coordinated manner" means that the terminals 20 transmit without implementing any prior association procedure with one or more base stations 31, such that they autonomously determine when they transmit and/or over which frequency they transmit, without any coordination of the terminals 20 between them and with the base stations 31.

Each base station 31 is suitable for receiving the messages from the terminals 20 which are located in its coverage zone. All or some of the data included in each message thus received are, for example, transmitted to a data server 32 of the access network 30, possibly accompanied by other items of information like an identifier of the base station 31 which has received said message, the measured reception power of said message, the measured reception date of said message, the measured reception frequency of said message, etc. The data server 32 processes, for example, the data of all the messages received by the different base stations 31.

Such as indicated above, a base station 31 in the coverage zone of which is located a terminal 20 is designated by "service base station" for this terminal 20.

Figure 2:
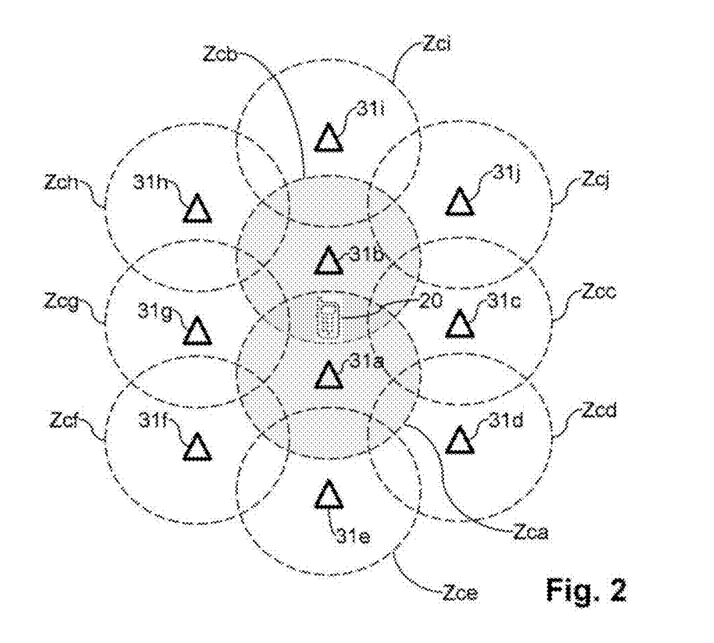
FIG. 2: an example of a geographic distribution of base stations of an access network of a wireless communication system.

FIG. 2 schematically represents an example of a geographical distribution of base stations 31 and of their respective coverage zones. In the example illustrated by FIG. 2, ten base stations are represented, designated respectively by 31a to 31j in order to be able to distinguish them. The respective coverage zones of the base stations 31a to 31j are designated respectively by Zca to Zcj.

In the example illustrated by FIG. 2, a terminal 20 is located in the coverage zone Zca of the base station 31a and in the coverage zone Zcb of the base station 31b. Consequently, the base stations 31a and 31b are service base stations for the terminal 20.

Figure 3:
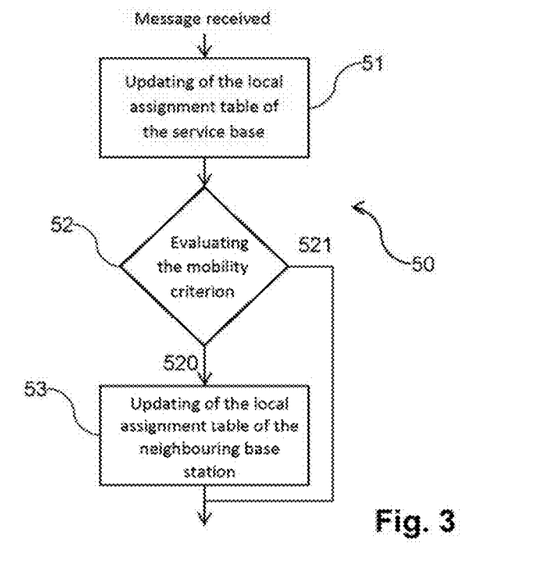
FIG. 3: a diagram illustrating the main steps of an association method between a terminal and a base station.

FIG. 3 schematically represents the main steps of a method 50 for associating a terminal 20 with a base station 31 of the access network 30. The different steps represented in FIG. 3 are all executed by the access network 30. Furthermore, although reference is mainly made, in the following description, to one single terminal 20, it must be noted that the access network 30 preferably implements the different steps of the association method 50 for all or some of the terminals 20 of the wireless communication system 10.

Such as illustrated by FIG. 3, the association method 50 comprises, when a service base station 31 receives a message from a terminal 20, a step 51 of updating, by said service base station 31, a local association table by storing, in said local association table of the service base station 31, an identifier of said terminal 20.

Indeed, each base station 31 of the access network 30 keeps updated a local association table which comprises a list of identifiers of the terminals 20 which are associated with it, i.e. from which said base station 31 is likely to receive messages in a near future. The terminals 20 from which a base station 31 is likely to receive messages in a near future correspond to the terminals which are located in the coverage zone of said base station 31 and, for mobile terminals 20, in the coverage zone of a base station neighbouring said base station in question. In contrast, the identifiers of the terminals 20 which are located in the coverage zone of a base station which is remote from said base station in question, are not located in the local association table of said base station in question, since said base station 31 in question is not, a priori, likely to receive messages transmitted by these terminals 20 in a near future.

If it is the first message received from this terminal 20 by the service base station 31, then the identifier of said terminal 20 is not, in principle, located in the local association table, such that the identifier is thus added in said local association table of the service base station 31.

However, if the service base station 1 has already received one or more messages from the terminal 20 which has transmitted the message which has just been received, the identifier of said terminal 20 can already be located in the local association table of the service base station 31. In this case, the updating step 51 consists at least in confirming that the identifier of said terminal 20 must be kept in said local association table.

Such as illustrated by FIG. 3, the association method 50 also comprises a step 52 of evaluating, by the access network 30 and using the messages received from said terminal 20, a predetermined mobility criterion of said terminal 20. By this evaluation, the access network 30 determines if the terminal 20 is likely to move to the coverage zone of another base station 31 of the access network 30.

If the mobility criterion is verified for said terminal 20 (reference 520 in FIG. 3), i.e. if said terminal 20 is likely to move to the coverage zone of another base station 31 of the access network 30, thus the association method 50 comprises a step 53 of updating the local association table of one (or more) base station(s) neighbouring the service base station 31, which has/have not received the message from said terminal, in order to add to it the identifier of said terminal 20.

"Base station neighbouring" the service base station 31 means a base station 31 which is geographically close to said service base station 31. Consequently, with the topology of the access network 30 being considered as known, the base stations 31 neighbouring a service base station 31 are known.

Generally, the base stations 31 of an access network 30 are distributed such that a given base station 31 is surrounded by several adjacent base stations 31, of which the coverage zones partially impinge over the coverage zone of said base station 31 in question. Such adjacent base stations 31 are direct neighbours of the base station 31 in question. However, it is also possible to consider, as a base station 31 neighbouring the base station 31 in question, base stations 31 which are not direct neighbours of said base station 31 in question, but which are direct neighbours of at least one of the adjacent base stations 31 of said base station 31 in question. For example, in FIG. 2, if the base station 31*a* is considered, thus:

- the base stations 31*b*, 31*c*, 31*d*, 31*e*, 31*f*, 31*g* are adjacent base stations of the base station 31*a*,
- the base stations 31*h*, 31*i*, 31*j* are not adjacent base stations 31 of the base station 31*a*, but are direct neighbours of the base station 31*b*, which is an adjacent base station of said base station 31*a*.

In the following the description, it is considered in a non-limiting manner that the base stations 31 neighbouring a service base station 31 correspond to the adjacent base stations of said service base station 31, i.e. of which the coverage zones are located in the direct vicinity of the coverage zone of the service base station 31.

It must be noted that when the mobility criterion is verified for the terminal 20 of which a message has been received by the service base station 31, the updating of the local association table of one or more neighbouring base stations only relate to neighbouring base stations which have not received this message. Indeed, the neighbouring base stations which also have received this message are also service base stations of said terminal 20, such that their local association tables have, in principle, also been updated during step 51 independently of the result of the evaluation of the mobility criterion by the access network 30.

In the case illustrated by FIG. 2, and by considering, as a service base station, the base station 31*a*, if the mobility criterion is verified, it is possible to update, during step 53, the association table of at least one of the base stations neighbouring the base station 31*a*, i.e. at least one of the base stations 31*c*, 31*d*, 31*e*, 31*f* and 31*g*. The base station 31*b* also neighbours the base station 31*a*, but it is also a service base station which has received the message from said terminal 20, such that its association table has, in principle, also be updated during step 51 of the association method 50. In this example, the local association tables of the base stations 31*h*, 31*i* and 31*j* are not updated to integrate into them the identifier of said terminal 20. Indeed, the base stations 31*h*, 31*i* and 31*j* being remote from said terminal 20 (as they do not neighbour the service base station 31*a* of said terminal 20), it is a priori unlikely that they receive a message from said terminal 20 in a near future.

If the mobility criterion is not verified (reference 521 in FIG. 3), then it is not necessary to update the local association table of one or more base stations neighbouring the service base station in question, which have not received the message transmitted by the terminal 20.

By keeping updated, in this way, the local association table of each base station 31, each base station 31 knows at least one part of the terminals 20 from which it is likely to receive messages. Such a knowledge can be implemented, for example, to allocate communication resources between the base station 31 and the data server 32 towards which said base station 31 must retransmit data included in the messages received.

Such as indicated above, the access network 30 evaluates the mobility criterion for the terminal 20 in order to determine, using the messages received from this terminal 20, if said terminal 20 is likely to move to the coverage zone of another base station 31 of the access network 30.

The evaluation step 52 is, for example, executed by the service base station 31 in question and/or by one or more association servers 33 of the access network 30. In the non-limiting example illustrated by FIG. 1, the access network 30 comprises an association server 33 which is integrated in the same equipment as the data server 32. It is also possible, in other examples, to have an association server 33 remote from said data server 32. Preferably, when the mobility criterion is verified, the equipment (service base station 31, association server(s) 33, etc.) of the access network 30 which has evaluated said mobility criterion for the terminal 20 indicates to the base station(s) 31 neighbouring said service base station 31 that they must update their local association tables to store in them the identifier of said terminal 20 as a terminal associated with these neighbouring base stations 31.

Several types of mobility criteria can be evaluated during the evaluation step 52, and selecting a specific mobility criterion only constitutes an implementation variant of the invention. Below, several examples of mobility criteria are described, each of these mobility criteria examples could be considered individually or in combination with one or more of the other mobility criteria examples.

According to a first example, which can be implemented directly by each base station 31, the service base station can keep, for each terminal 20 of which the identifier is stored in the local association table, a history of the reception date of at least the preceding message received from said terminal 20. In such a case, the mobility criterion is, for example, considered as verified, if the time elapsed between the reception date of the message received and the reception date of the preceding message received from the same terminal 20 is greater than a predetermined duration. This duration is, for example, selected a lot greater (for example, by at least a factor of one hundred), than the average period for transmitting messages by said terminal 20. Consequently, if the time elapsed is greater than this duration, this means that the service base station 31 has missed numerous messages transmitted by this terminal 20, and that the terminal 20 has probably moved outside of the coverage zone of the service base station 31 between the receptions of these two messages.

According to another example, each base station 31 which receives a message from a terminal 20 can inform the association server 33 of this reception. In such a case, the association server 33 can determine, for a given terminal 20, if the service base stations 31 of said terminal 20 vary over time. If the service base stations 31 of said terminal 20 vary over time, the mobility criterion is considered as verified for this terminal 20, and the association server 33 can indicate it to the base stations neighbouring each service base station of said terminal 20, which neighbouring base stations can decide to update their association table if they have not received the message transmitted by this terminal 20.

In preferred embodiments, the association method 50 comprises, for each message received from said terminal 20 by a base station 31, an estimation of the quality of a channel between said terminal 20 and said base station 31. The mobility criterion is thus evaluated using at least one value of the quality of the channel.

For example, the quality of the channel is estimated, by a base station 31, by measuring the reception power of the message transmitted by the terminal 20. In such a case, the mobility criterion is, for example, considered as verified if the value of the quality of the channel for the last message received is less than a predetermined threshold value. This threshold value is selected as being representative of the channel quality for a terminal 20 being located in the proximity of the limit of the coverage zone of the service base station 31. Consequently, if the value of the quality of the channel is less than this threshold value, this means that the terminal 20 is likely to exit the coverage zone of the service base station 31 and to enter into the coverage zone of another base station 31. Such a mobility criterion is advantageous in that it can be evaluated, for example, independently by each service base station 31 of said terminal 20.

According to another example, the evaluation of the mobility criterion comprises a calculation of a magnitude representative of the variation of the value of the quality of the channel for a plurality of messages received from said terminal 20, and the mobility criterion is considered as verified when the calculated magnitude verifies a predetermined criterion of variation of the quality of the channel. For example, the magnitude calculated corresponds to the standard deviation of different values of the quality of the channel, and the criterion of variation of the quality of the channel is considered as verified if the standard deviation calculated is greater than a predetermined threshold value. According to another example, the magnitude calculated corresponds to the difference between the value of the quality of the channel of the message received and the value of the quality of the channel for the preceding message received from the same terminal 20, and the variation criterion of the quality of the channel is, for example, considered as verified if the absolute value of the calculated magnitude is greater than a predetermined threshold value. Such mobility criteria can also be evaluated directly by each service base station 31 of said terminal 20. However, such mobility criteria can also be advantageously evaluated by the association server 33 which, if necessary, can consider, for one same terminal 20, values of the quality of the channel estimated by each of the service base stations 31 of said terminal 20.

Such as indicated above, the estimation of the quality of the channel for a message, corresponds for example to a measurement of the reception power of said message by the base station 31 in question. Nothing excludes however, according to other example, to consider other magnitudes representative of the quality of the channel (signal to noise ratio, bit error rate, message error rate, etc.).

In preferred embodiments, the association method 50 comprises, for a message received from said terminal 20 by at least two service base stations 31, a measurement of a reception frequency of said message by said at least two service base stations 31, and the evaluation of the mobility criterion comprises a comparison of measured reception frequencies. In a known manner, a message is transmitted by the terminal 20 over an emission frequency predetermined by said terminal 20. However, if the terminal 20 moves, the reception frequency of said message by a service base station 31 can be, by Doppler effect, substantially different from the emission frequency, and furthermore can vary from one service base station 31 to another. However, if the terminal 20 is immobile, the reception frequencies of said message by different service base stations 31 are, in principle, substantially equal. Consequently, it is understood that it is possible to determine if the terminal 20 moves by comparing the measured reception frequencies for one same message received by two different service base stations 31, and the mobility criterion is, for example, considered as verified if said reception frequencies are not the same for the two service base stations 31.

In preferred embodiments, the association method 50 comprises, for a message received from said terminal 20 by at least two service base stations 31, a measurement of a reception date of said message by said at least two service base stations 31, and the evaluation of the mobility criterion comprises a comparison of the measured reception dates. In a known manner, a message transmitted by the terminal 20 is received by two service base stations 31 at respective reception dates that are different except if said terminal 20 is located at equal distance from said two service base stations 31. By comparing said reception dates of messages by different service base stations 31, it is thus possible to determine if the terminal 20 has moved. For example, it is possible to calculate a difference between the reception dates of one same message by a pair of service base stations 31. Such a difference is known under the name, DTOA ("Difference of Time of Arrival") measurement. It is understood that if the DTOA measurement, for one same pair of service base stations 31, varies from one message to another transmitted by the same terminal 20, this means, in principle, that said terminal 20 has moved between the emissions of these messages. Thus, the mobility criterion can be considered as verified if the DTOA measurement, for one same pair of service base stations 31, varies over time. It is also known that the position of said terminal 20 can be estimated according to DTOA measurements taken on one same message for several different pairs of service base stations 31. In such a case, the access network 30 can determine the position of said terminal 20 according to DTOA measurements taken for several different pairs of service base stations 31, and the mobility criterion can be considered as verified if the determined position of said terminal 20 varies over time.

In preferred embodiments, the evaluation of the mobility criterion can comprise the association, to the terminal 20 in question, of a degree of mobility among several predefined degrees of mobility. The updating of the local association table, by a service base station 31 or a base station 31 neighbouring said service base station, is thus done according to the degree of mobility assigned to said terminal 20.

For example, it is possible to define the following degrees of mobility: "immobile", "mobile" and "very mobile". To assign a degree of mobility at the terminal 20, it is for example possible to consider, in the examples described above, several threshold values. In the case, for example, where the calculated magnitude corresponds to the difference between the value of the quality of the channel of the message received and the value of the quality of the channel for the preceding message received from the same terminal 20, thus said terminal 20 is considered as:

"immobile" if the absolute value of the calculated magnitude is less than a first predetermined threshold value, in which case the mobility criterion is not verified, "mobile" if the absolute value of the calculated magnitude is greater than the first threshold value and less than a second predetermined threshold value, greater than the first threshold value, in which case the mobility criterion is considered as verified, "very mobile" if the absolute value of the calculated magnitude is greater than the second threshold value; there again, the mobility criterion is considered as verified.

The degree of mobility of the terminal 20 can be used, for example, to determine the base stations 31 neighbouring the service base station 31 of which the local association table must be updated. For example, for a "mobile" terminal 20, only the adjacent base stations of said service base station are considered to the updating. For a "very mobile" terminal 20, it is possible to also consider base stations in the direct vicinity of said adjacent base stations 31 of the service base station 31 in question.

According to another example, the terminal 20 can include, in each message transmitted towards the access network 30, an item of information making it possible for said access network 30 to evaluate if said terminal 20 is likely to move in the coverage zone of another base station 31. In particular, it is possible to assign, a priori, a degree of mobility to said terminal 20, for example "immobile" or "mobile", which is stored in a non-volatile memory of said terminal 20. If necessary, said terminal 20 includes the degree of mobility thereof in each transmitted message, and the mobility criterion is considered as verified if the degree of mobility extracted from the message corresponds to "mobile". According to another example, the terminal 20 can comprise localisation means, such as a GPS ("Global Positioning System") sensor, suitable for determining the position of said terminal 20. In such a case, the information included in each message corresponds, for example, to the position determined by said terminal 20, and the access network 30 can thus determine the degree of mobility of said terminal 20 by comparing the positions extracted from successive messages received from said terminal 20. In a variant, the terminal 20 can also estimate its degree of mobility according to the positions successively determined by its localisation means, and only include the degree of mobility thus estimated in each transmitted message.

According to another example, it is possible to assign, a priori, a degree of mobility to said terminal 20, for example "immobile" or "mobile", which is for example stored in a non-volatile memory of the association server 33. In such a case, a service base station 31 which receives a message from said terminal 20 can request the degree of mobility associated with said terminal 20 to the association server 33, and the mobility criterion is considered as verified if the degree of mobility associated with the terminal 20 stored by the association server 33, corresponds to "mobile".

In preferred embodiments, the identifier of a terminal 20 is removed from the local association table of a base station 31 of the access network 30, when a predetermined removal criterion is verified.

Such arrangements make it possible to limit the quantity of information stored in a local association table by removing the information which is, a priori, obsolete, relating to a terminal 20 of which it is unlikely that the base station 31 in question can receive a message. This is advantageous, for example, to avoid uselessly allocating communication resources between said base station and the data server 32.

For example, the removal criterion is considered as verified when the base station 31 in question has not received any message from said terminal 20 for a predetermined maintenance duration. Indeed, if a base station 31 does not receive any message from a terminal 20 for a maintenance duration of around one or more days, then this terminal 20 has probably moved outside of the coverage zone of the base station 31. Consequently, the information relating to this terminal 20, and in particular its identifier, can be removed from the local association table of the base station 31 in question. Such a removal criterion is particularly advantageous in that it can be evaluated independently by the base station 31 in question, without requiring interactions with other equipment of the access network 30 (other base station 31, association server 33, etc.). It must be noted that it is possible, in specific embodiments, to consider different maintenance durations to evaluate the removal criterion. For example, it is possible to consider different maintenance durations for the terminals 20 of different degrees of mobility. If necessary, the maintenance duration for a "very mobile" terminal 20 is preferably less than the maintenance duration for an "immobile" terminal 20.

Other removal criterion examples are however possible, and can be considered alternatively or complementarily to said removal criterion described above. For example, it is possible, for a service base station 31 which receives a message from a terminal 20, to indicate to its neighbouring base stations 31 that it has received this message from said terminal 20. Such an indication can be done directly, from base station to base station, or by way of other equipment, like for example, by way of the association server 33. Each neighbouring base station 31 which receives such an indication can thus verify if it has itself received this message from said terminal 20 and, if it has not received it, deduce that it has missed a message transmitted by said terminal 20. After having determined, in this way, that one or more messages transmitted by one same terminal 20 have been missed, a base station 31 can thus remove the identifier from said terminal 20 of the local association table thereof.

Figure 4:
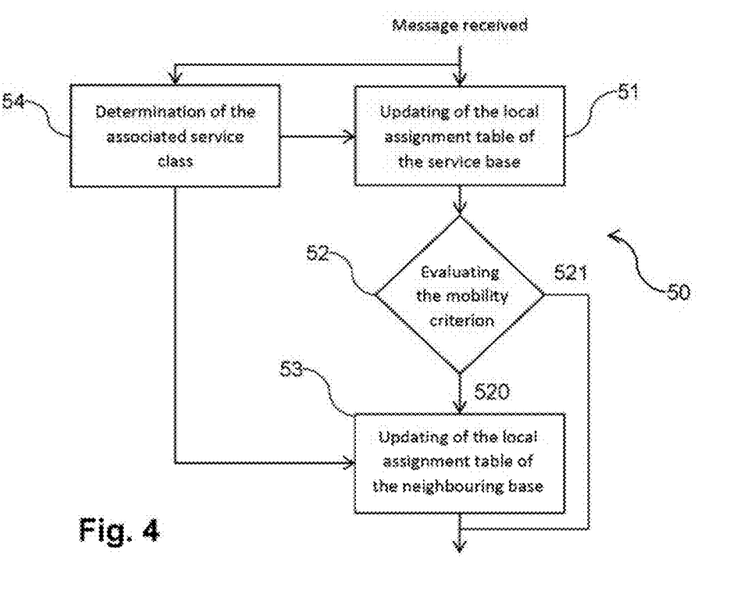
FIG. 4: a diagram illustrating the main steps of a preferred embodiment of an association method.

FIG. 4 schematically represents the main steps of a specific mode of implementation of the association method 50. Such as illustrated by FIG. 4, the association method 50 further comprises a step 54 for determining a service class associated with said terminal 20.

"Service class" associated with a terminal 20 means any information or list of information relating to the limitations to be respected in the processing of the messages received from this terminal 20.

For example, the service class associated with a terminal 20 can comprise a list of quality of service levels authorised for communications between the base stations 31 and the data server 32.

Alternatively, or complementarily, the service class associated with a terminal 20 can comprise a list of security levels (authentication, encryption, etc.) authorised for the communications between the base stations 31 and the data server 32.

Alternatively, or complementarily, the service class associated with a terminal 20 can comprise a list of communication protocols authorised for data exchanges between the base stations 31 and the data server 32. Indeed, the access network 30 can use several communication protocols to exchange data between a base station 31 and the data server 32, each base station 31 being suitable for exchanging data with said data server 32 by using at least one of the communication protocols of the access network 30. These different communication protocols can be wired (Ethernet, etc.) or wireless (GSM, 3G, LTE, Wi-fi, connection by satellite in travelling or geostationary orbit, etc.). In such a case, the service class can indicate the list of authorised communication protocols, or equivalently, the list of non-authorised communication protocols. For example, it is possible to forbid a connection by satellite in order to avoid the costs associated with the use of such a communication protocol.

It must be noted that in the context of the present invention a list can only comprise one single entry. Thus, a list of authorised service quality levels can comprise only one single service quality level.

Once the service class associated with said terminal 20 has been determined, the association method 50 comprises, during step 51 of updating by the service base station 31, the storing of said service class associated with said terminal 20 with the identifier of said terminal 20. Preferably, during step 53 of updating by a neighbouring base station 31 not having received the message, the service class associated with said terminal 20 is also stored in the local association table of said neighbouring base station 31, with the identifier of said terminal 20.

Thanks to the storage, in the local association table, of the service class associated with a terminal 20, this service class can be applied for all the messages received later from this terminal 20, and this, without the terminal 20 having to implement an association procedure beforehand with the base station 31 in question.

Figure 5:
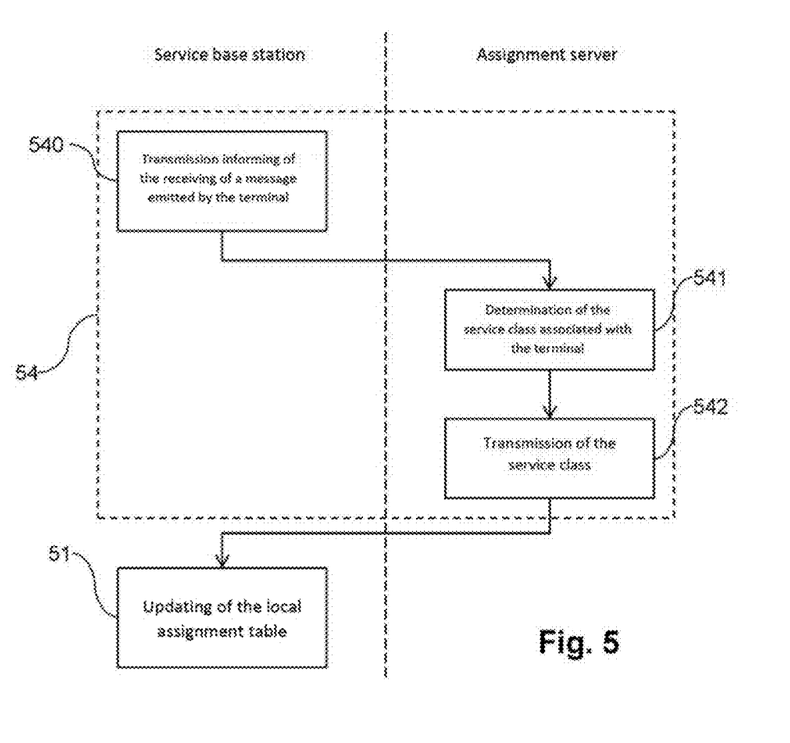
FIG. 5: a diagram illustrating the main steps of a preferred embodiment of a step of determining a service class associated with a terminal.

FIG. 5 schematically represents a preferred embodiment of step 54 of determining the service class of a terminal 20. Such as illustrated by FIG. 5, the determination step 54 comprises, when a service base station 31 receives a message from said terminal 20, steps of:

540 transmitting, by a service base station 31, a notification towards an association server 33, informing said association that said service base station 31 has received a message from said terminal 20,

541 determining, by the association server 33, the service class associated with said terminal 20,

542 transmitting, by the association server 33, the service class associated with said terminal 20 towards the service base station.

Thus, in the embodiment illustrated by FIG. 5, it is the association server 33 that determines the service class associated with said terminal 20. For example, the association server 33 comprises a global association table storing a list of identifiers of all or part of the terminals 20 of the wireless communication system 10 and, for each terminal 20 identifier, the service class associated with this terminal 20.

Once the service class is determined, the association server 33 transmits it to the service base station 31. When the mobility criterion is verified, the determined service class is also transmitted to the neighbouring base stations 31, by the service base station 31 and/or by the association server 33.

Such as indicated above, the different steps of the association method 50 are executed by the access network 30, i.e. by one or more items of equipment of said access network 30. In particular, it has been described that the different steps of the association method 50 are executed by one or more base stations 31 of the access network 30, and possibly furthermore, by the association server 33.

Each base station 31 comprises wireless communication means making it possible for said base station to receive messages transmitted by the terminals 20. The wireless communication means comprise in a conventional manner a radioelectric circuit comprising equipment (antenna, amplifier, local oscillator, mixer, analogue filter, etc.) considered as known to a person skilled in the art.

Each base station 31 further comprises, for example, a processing circuit (not represented in the figures), comprising one or more processors and storage means (magnetic hard disk, electronic memory, optical disk, etc.), wherein a computer program product is stored in the form of a set of program code instructions to be executed to implement the different steps of the association method 50 which must be executed by said base station 31. Alternatively, or complementarily, the processing circuit comprises one or more programmable logic circuits (FPGA, PLD, etc.), and/or one or more specialised integrated circuits (ASIC), and/or a set of electronic components, etc., suitable for implementing all or part of said steps of the association method 50.

In other words, the processing circuit of a base station 31 comprises a set of means configured by software (specific computer program product) and/or by hardware (FPGA, PLD, ASIC, electronic components, etc.) to implement the steps of the association method 50 executed by the base station 31.

In the case where some steps of the association method 50 are executed by the association server 33, the base stations 31 and the association server 33 comprise respective network communication means making it possible for the base stations 31 to exchange data with the association server 33.

The network communication means comprise in a conventional manner a communication circuit suitable for implementing a wired communication protocol (Ethernet, etc.) or wireless (GSM, 3G, LTE, Wi-fi, connection by satellite in travelling or geostationary orbit, etc.). It must be noted, that the data exchanges between a base station 31 and the association server 33 can be done directly, in which case the communication circuits of said base station 31 and of the association server 33 implementing the same communication protocol. However, the data exchanges between a base station 31 and the association server 33 can be done indirectly, by means of other equipment. In such a case, the communication circuits of said base station 31 and of the association server 33 can implement different communication protocols.

The association server 33 further comprises, for example, a processing circuit (not represented in the figures), comprising one or more processors and storage means (magnetic hard disk, electronic memory, optical disk, etc.) wherein a computer program product is stored in the form of a set of program code instructions to be executed to implement the different steps of the association method 50 which must be executed by said association server 33. Alternatively, or complementarily, the processing circuit comprises one or more programmable logic circuits (FPGA, PLD, etc.), and/or one or more specialised integrated circuits (ASIC), and/or a set of electronic components, etc., suitable for implementing all or part of said steps of the association method 50.

In other words, the processing circuit of the association server 33 comprises a set of means configured by software (specific computer program product) and/or by hardware (FPGA, PLD, ASIC, electronic components, etc.) to implement the steps of the association method 50 executed by said association server 33.

More generally, it must be noted, that the embodiments and implementations considered above have been described as non-limiting examples, and that other variants are possible.

In particular, the invention has been described by considering a UNB wireless communication system 10. It is also possible, however and according to other examples, to consider other types of wireless communication systems. The invention however finds a particularly advantageous application in the wireless communication systems in which the messages are transmitted in a non-coordinated manner.

The description above clearly illustrates that by the different characteristics thereof and the advantages thereof, the present invention achieves the aims that have been set. In particular, the quantity of information stored in the local association table of a base station 31 can be limited since only the identifiers of the terminals 20 being located in the coverage zone of said base station 31 or likely to move in a near future in said coverage zone of said base station 31 (because they are in the coverage zone of a neighbouring base station 31 and because they are furthermore considered as mobile) are stored in said local association table. The mobile terminals 20 located in the coverage zone of a neighbouring base station 31 are also associated with said base station 31 in question before they move in the coverage zone of said base station 31 in question, which makes it possible to limit the delay in the retransmission and/or the loss of data for the first messages which will be received from such a terminal 20 from the time where it has moved in the coverage zone of said base station 31 in question.

The invention claimed is:

1. A method for associating a terminal to a base station of an access network of a wireless communication system, the access network comprising a plurality of base stations, wherein in response to a receipt of a message from the terminal by a base station, the method comprises steps of:
    updating, by the base station, of a local association table of the base station by storing an identifier of the terminal in the local association table of the base station as a terminal associated with the service base station;
    evaluating, by the access network, of a predetermined mobility criterion of the terminal; and
    in response to verification of the predetermined mobility criterion of the terminal, updating, by a neighbouring base station that has not received the message from the terminal, of a local association table of the neighbouring base station by storing the identifier of the terminal in the local association table of the neighbouring base station as a terminal associated with the neighbouring base station.

2. The method according to claim 1, further comprising a step of removing the identifier of the terminal from the local association table of the base station of the access network in response to a verification of a predetermined removal criterion.

3. The method according to claim 1, further comprising, for each message received from the terminal by the base station, a step of at least one of measuring a physical characteristic of the message and extracting an item of information included in the message; and wherein the predetermined mobility criterion is evaluated using at least one of the following: at least one measurement of physical characteristic and at least one extracted item of information.

4. The method according to claim 1, further comprising, for each message received from the terminal by the base station, a step of estimating quality of a channel between the terminal and the base station; and wherein the predetermined mobility criterion is evaluated using at least one value of the quality of the channel.

5. The method according to claim 4, wherein the step of evaluating the predetermined mobility criterion further comprises a step of calculating a magnitude representative of a variation of said at least one value of the quality of the channel for a plurality of messages received from the terminal, the predetermined mobility criterion being verified in response to a verification of the calculated magnitude to a predetermined criterion of variation of the quality of the channel.

6. The method according to claim 1, further comprising, for a message received from the terminal by at least two base stations, a step of determining at least one of a reception frequency and a reception date of the message by said at least two service base stations; and wherein the evaluation of the predetermined mobility criterion comprises comparing at least one of the reception frequencies and the reception dates determined by said at least two service base stations.

7. The method according to claim 1, further comprising a step of determining a service class associated with the terminal, and wherein the step of updating of the local association table comprises a step of storing the service class associated with the terminal in the local association table of the base station.

8. The method according to claim 7, wherein the step of determining the service class of the terminal comprises steps of:
    transmitting, by the base station, a notification to an association server;
    determining, by the association server, the service class associated with the terminal; and transmitting, by the association server, the service class associated with the terminal to the base station.

9. The method according to claim 7, wherein a plurality of communication protocols is utilized in the access network to exchange data between the base station and a data server, the service class associated with the terminal comprises a list of communication protocols authorized for retransmitting data included in the message received from the terminal by the data server.

10. The method according to claim 9, wherein the data exchanges between the base station and the data server are performed utilizing a communication protocol providing different service quality levels; and wherein the service class associated with the terminal comprises a list of service quality levels authorized for retransmitting data included in the message received from the terminal by the data server.

11. The method according to claim 1, wherein, each base station is configured to retransmit data included in each message received to a data server of the access network, the method further comprising, for each base station, a step of allocating communication resources between said each base station and the data server based on the local association table of said each base station.

12. An access network of a wireless communication system, the access network comprising a plurality of base stations, each base station comprising a processor and at least one base station configured to receive a message from a terminal being defined as a service base station, in response to a reception of the message from the terminal by the service base station, the processor of the service base station is configured to:
update a local association table of the service base station by storing an identifier of the terminal in the local association table of the service base station as a terminal associated with the service base station;
evaluate a mobility criterion of the terminal; and
update a local association table of a base station neighbouring the service base station and not having received the message from the terminal by storing the identifier of the terminal in the local association table of the neighbouring base station by the processor of the neighbouring base station as a terminal associated with the neighbouring base station in response to the verification of the mobility criterion.

13. The access network according to claim 12, wherein the processor of each base station is configured to remove the identifier of the terminal from the local association table of said each base station in response to a verification of a predetermined removal criterion.

14. The access network according to claim 12, wherein the processor of the service base station is configured to perform at least one of measuring a physical characteristic of each message received from the terminal and extracting an item of information included in said each message received from the terminal; and configured to evaluate the mobility criterion using at least one of the following: at least one measurement of physical characteristic and at least one item of information extracted.

15. The access network according to claim 12, wherein the processor of the service base station is configured to estimate quality of a channel between the terminal and the service base station; and configured to evaluate the mobility criterion using the values of the quality of the channel estimated for a plurality of messages received from the terminal.

16. The access network according to claim 12, wherein the processor of the service base station is configured to determine at least one of a reception frequency and a reception date of each message received from the terminal; and configured to evaluate the mobility criterion by comparing at least one of the reception frequencies and reception dates determined for a same message by at least two service base stations.

17. The access network according to claim 12, wherein each base station is configured to retransmit data included in each message received to a data server of the access network; and wherein each base station is allocated communication resources between said each base station and the data server based on the local association table of said each base station.

18. Access network according to claim 12, wherein:
the service base station comprises a transmitter configured to transmit a notification to an association server of the access network;
the association server comprises a processor configured to determine a service class associated with the terminal;
the association server comprises a transmitter configured to transmit the service class associated with the terminal to the service base station; and
the processor of the service base station is configured to update the local association table by storing the service class associated with the terminal.

19. An access network of a wireless communication system, the access network comprising an association server and a plurality of base stations, each base station comprising a processor and at least one base station configured to receive a message from a terminal being defined as a service base station, in response to a reception of the message from the terminal by the service base station, a processor of the association server is configured to:
update a local association table of the service base station by storing an identifier of the terminal in the local association table of the service base station as a terminal associated with the service base station;
evaluate a mobility criterion of the terminal; and
update a local association table of a base station neighbouring the service base station and not having received the message from the terminal by storing the identifier of the terminal in the local association table of the neighbouring base station as a terminal associated with the neighbouring base station in response to the verification of the mobility criterion.

* * * * *